United States Patent [19]
Pelat

[11] 3,947,007
[45] Mar. 30, 1976

[54] SHOCK AND VIBRATION INSULATOR
[75] Inventor: Patrice Pelat, Paris, France
[73] Assignee: Vibrachoc, Paris, France
[22] Filed: Dec. 20, 1974
[21] Appl. No.: 534,864

[30] Foreign Application Priority Data
Dec. 21, 1973 France .................. 73.45978

[52] U.S. Cl. ..................... 267/136; 248/358 R
[51] Int. Cl.² ................................ F16F 9/10
[58] Field of Search .......... 267/136, 137; 248/358 R, 248/21, 24, 9, 15

[56] References Cited
UNITED STATES PATENTS
| | | | |
|---|---|---|---|
| 3,107,752 | 10/1963 | McLean | 248/358 R |
| 3,721,417 | 3/1973 | Skala et al. | 248/358 R |
| 3,874,646 | 4/1975 | Vernier | 248/358 R |

FOREIGN PATENTS OR APPLICATIONS
1,187,712   1/1956   France ...................... 248/358

*Primary Examiner*—James B. Marbert
*Attorney, Agent, or Firm*—Cushman, Darby & Cushman

[57] ABSTRACT

A shock and vibration insulator comprises an axial rigid element fastenable to an installation to be damped, a peripheral rigid element also fastenable to said installation and a radial rigid element extending radially between said elements and comprising a first radial part having an internal recess in the shape of an annular groove and a second radial part having a peripheral edge penetrating into said recess in which it can move radially so as to provide a fairly closed annular chamber.

12 Claims, 5 Drawing Figures

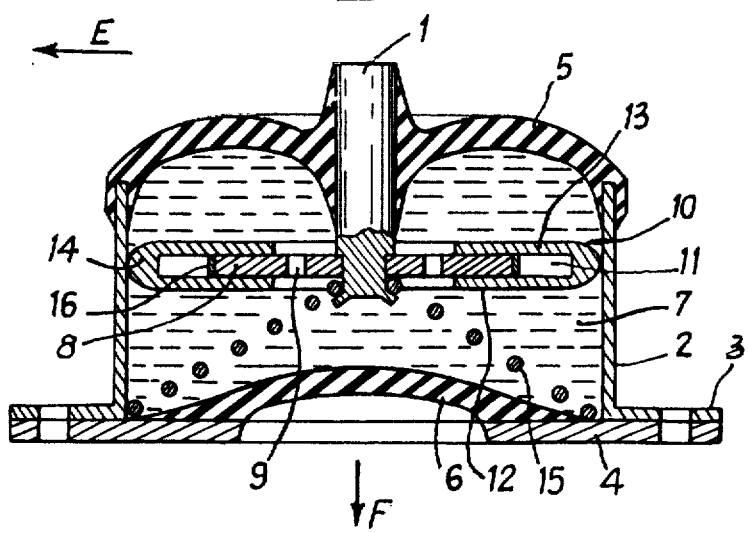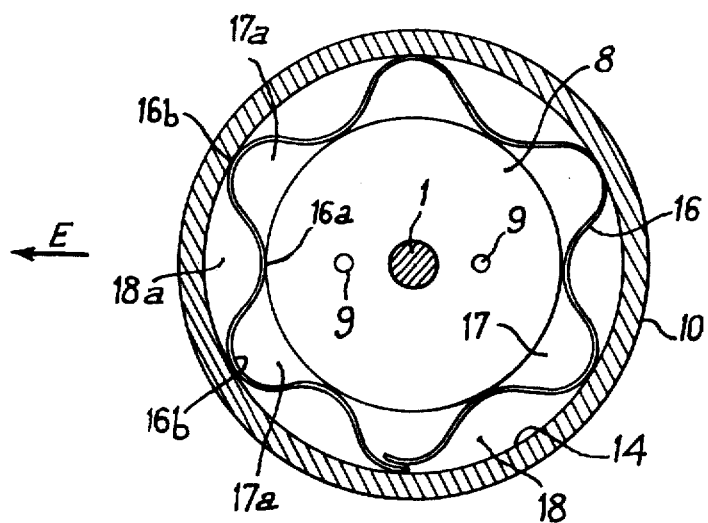

SHOCK AND VIBRATION INSULATOR

The present invention relates to a shock and vibration insulator with high internal damping. Such insulators can be used particularly for the suspension of parts subjected to vibrations on a chassis or frame.

In certain embodiments the insulator can also be incorporated in a hydraulic jack.

Previously known insulators have a central rigid element, a peripheral rigid element, at least one elastomer membrane connecting the two rigid elements with the volume thus determined being filled with a fluid such as, for example, a grease. One of the said rigid elements can also have a radial element, more or less in the shape of a piston so as to determine in the fluid-tight volume, two partial volumes connected by a constriction thereby forcing the fluid, such as grease, to travel from one of the volumes to the other during relative movement of the two elements.

While such previously known insulators are relatively satisfactory with regard to vibrations which are directed in an axial direction, when the vibrations have mainly radially components, the two partial volumes remain fairly constant and the damping becomes much slighter because the fluid is simply moved within its volume and is not forced to pass through a constriction even if the fluid is very viscous.

On the other hand, in known piston shock absorbers provided with a slightly viscous fluid, neither lateral movement nor lateral damping is possible.

Further, precisely because of such insufficient damping, precautions have to be taken to prevent rough impacts of the rigid elements against one another during very considerable radial movements, thereby complicating the design of the insulator which, in turn, increases the cost thereof.

The present invention overcomes these drawbacks and provides a shock or vibration insulator exhibiting high internal damping both in axial and radial movements and with the use of internal fluids exhibiting a broad range of viscosity values. The present invention is also directed to an insulator which is simple and economic in design and fabrication.

More particularly the present invention relates to a vibration and shock insulator with high internal damping comprising 1. an axial rigid element fastenable to one portion or part of an installation to be damped;
2. a peripheral rigid element fastenable to another portion or part of said installation; and
3. a radial rigid element extending radially between said elements (1) and (2) and being solid with one of said elements, said radial rigid element capable of being subjected to the thrust of a fluid and comprising
   a. a first radial part presenting an internal recess in the shape of an annular groove, and
   b. a second radial part penetrating by a peripheral edge, into said recess in which it can move radially, so as to provide in said recess a fairly closed annular chamber, the internal volume of said chamber being filled with said fluid.

The present invention is also distinguished from known shock absorbers of a type presenting a piston provided with two radial parts, one of which forms an annular groove in which the other part can penetrate, the said parts being able to be fitted by friction one in the other so that the movement of one of the parts in the groove causes a damping friction without the presence of any fluid.

Actually, in accordance with the present invention, the friction between the two parts of the choking element is slight or zero, the desired damping effect being caused by the radial movement of one of the parts in the other thereby modifying the geometry of the annular chamber so as to cause damping by the movement of the fluid contained in the chamber formed thereby.

By using a sufficiently viscous fluid, a considerable damping can be obtained by the simple movement of the fluid contained in the chamber at the time of the radial movement of one of the parts relative to the other.

However, it is also advantageous to introduce into the chamber an elastic element so as to compartment the chamber and provide choking passages between these compartments, without opposing the relative movement of the two parts of the radial rigid element.

Thus, in a particular embodiment of the present invention, it is possible to incorporate in said chamber an undulating spring resting, on the one hand, on the bottom of the groove, and, on the other hand, on the edge of the radial part penetrating into said groove, the height of the spring being slightly less than the thickness of the groove. In this way, the undulating spring establishes on the inside of the annular chamber relatively closed partial volumes. When the said first and second radial parts come toward one another, the undulation or undulations located in the zone of approach are flattened thereby reducing the partial volumes that they establish so as to create additional pressure in the fluid contained in the partial volumes concerned which, in turn, permits the fluid to pass between the spring and edges of the chamber.

In a first embodiment of the present invention, the insulator comprises at least a deformable membrane, preferably elastic, connecting said rigid elements to form a fluid-tight deformable volume, said volume being filled entirely with a fluid, preferably a viscous fluid, while the radial rigid element divides said volume into two half volumes, and constitutes a choking element having a passage between said half volumes.

In a particular embodiment of this first mode of the present invention, the peripheral rigid element can comprise a rigid bottom located opposite a single deformable membrane.

As a variant, a second membrane extending opposite the first membrane which carries the axial radial element can be provided.

In certain particular embodiments, this second membrane can also be fastened at its center to the axial rigid element and in this case the insulator preferably presents a radial plane of symmetry, the said two membranes being symmetrical relative to this plane.

The radial rigid element constituting the choking element can have a diameter corresponding approximately to the inside diameter of said peripheral rigid element with passages then being provided in said second radial part so as to constitute chokes permitting the passage of said fluid.

As a variant, the diameter of the inside rigid element can be different from that of the rigid elements which do not carry it and thus be in communication with a choke passage.

The rigid choke element can be carried either by the axial rigid element or by the peripheral rigid element. In each case, the rigid element carrying the choke element can be connected directly to either of the two parts, the other part then being free to move relative to the rigid element.

In a second embodiment of the present invention, the insulator can be made up of a jack, preferably a double action jack with the peripheral rigid element forming the body of the jack and the axial rigid element forming the rod. The axial rigid element thus forms the jack piston, and its diameter is fitted exactly to the diameter of one of the two rigid elements. The jack receives on one or both of the two faces the thrust of a fluid of a similar or identical nature as that of the fluid contained in the chamber.

Other advantages and characteristics of the invention will become apparent from the following description, given by way of non-limiting example and with reference to the accompanying drawings wherein:

FIG. 1 represents an axial section of an insulator according to the invention;

FIG. 2 represents a radial cross section of the rigid choke element;

Figure 3:
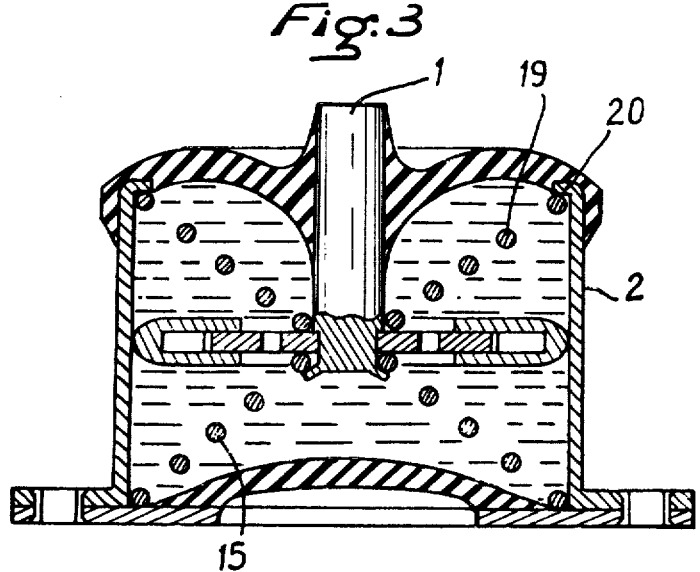
FIG. 3 represents an axial section of an insulator according to a variant of the present invention.

Referring to FIGS. 1 and 2, the insulator shown therein presents a symmetry of revolution around a vertical axis, and comprises (1) an axial rigid element 1 in the shape of a cylindrical rod, optionally provided with fastening means (not shown), such as threads, to fasten it to a part of an installation to be protected against shock and vibration; (2) a peripheral rigid element 2 presenting a generally cylindrical shape with an outside flange 3. The rigid element 2 is completed by an annular plate 4 fastened under flange 3 and has an inside orifice of a diameter less than the inside diameter of the cylindrical part of rigid element 2. Adhered to element 1 is an elastomer membrane 5 presenting generally a shape bulging outward as shown in the drawing, this membrane also adhering at its periphery to the upper part of peripheral rigid element 2.

On the inside surface of annular plate 4 there is also adhered a second elastomer membrane 6 having approximately the shape of an arch. It can be seen that in this way there is established an internal volume 7 which is entirely filled with a fluid, preferably a fluid whose viscosity is selected as a function of the desired characteristics of the shock and vibration insulator of the present invention.

Within volume 7 there is crimped, on element 1, a rigid part 8 in the form of a circular plate provided with two orifices 9 forming a choke passage for the fluid. This plate 8 forms said second radial part.

Also within said volume 7 there is provided a first radial part 10 having, externally, the shape of a flat ring, whose largest diameter is slightly less than the inside diameter of peripheral rigid element 2 and whose inside diameter is clearly smaller than the outside diameter of said circular plate 8. The element presents on its inside a cavity 11 delimited by two radial walls 12 or 13 connected, on the outside peripheral side, by part 14. Cavity 11 thus forms a groove within part 10. In this groove penetrates, with play permitting movement, rigid part 8 so that cavity 11 is limited to an annular chamber which is filled with the same fluid as volume 7.

Part 10 can advantageously be made by casting, in a single piece, an elastic material whose deformation permits the introduction of part 8. Alternatively it can be made, for example, from two parts respectively making up walls 12 and 13 which are then welded together.

A coil spring 15 can advantageously be provided to engage at its base plate 4 and its top, rigid plate 8.

Finally, and preferably, an undulating spring 16 is provided in cavity 11. As can be seen particularly in FIG. 2, this spring has undulations whose summits engage alternately the peripheral edge of part 8 and the bottom of the groove of part 10. As can be seen in FIG. 1, the height of this spring 16 is slightly less than the height of the groove. Spring 16 delimits in the groove a certain number of partial volumes 17a and 18a. As can be seen, the fluid in each partial volume thus established is essentially imprisoned and separated from the other of said partial volumes.

The insulator of the present invention functions in the following manner.

Starting from the rest position shown in FIG. 1, axial rigid element 1 is thrust downwardly in the direction of arrow F under the action, for example, of vibrations. Under these conditions, the upper half volume tends to increase because of the downward movement of the choke element made up of radial rigid parts 8 and 10, while the lower half volume tends to diminish despite a certain deformation of elastic membrane 6. Under these conditions, the fluid placed in the lower half volume passes through choke channels 9 thereby expanding into the upper half volume; this forced passage creating a damping effect. Spring 15 not only provides stiffness but at the end of the thrust, assists in returning the insulator to its initial position.

It is to be understood that in this embodiment it is possible to replace elastic membrane 5 by a deformable, nonelastic, fluid-tight membrane, for example, a linen-faced membrane, the deformation of membrane 6 making it possible to keep the volume of the fluid constant. If, on the other hand, as is possible in a variant of the present invention, annular plate 4 is replaced by a closed flat disk, by eliminating the stationary membrane, it is necessary to make membrane 5 in elastic form so as to permit it to distend thereby keeping the lower volume of the fluid constant.

Further, it is to be understood that it is not necessary that part 10 be mounted with a very exact play on part 8 so as to maintain fluid tightness, because, at the time of movement, for example a downward movement in the direction of arrow F, the pressure increases in the lower half volume, which forces wall 12 against part 8 and practically prevents the fluid from travelling in a path other than through choke channels 9.

Of course, choke channels 9 can be eliminated in accordance with another embodiment of the present invention wherein the outside diameter of part 10 is then suitably less than the inside diameter of peripheral rigid element 2, thereby establishing between said part 10 and said peripheral rigid element 2 a choke passage so as to permit passage of the fluid from one of said half volumes to the other.

When axial rigid element 1 is moved in a radial direction, for example along arrow E, part 14 is blocked radially by peripheral rigid element 2. Rigid part 9 then moves to the left on the inside of part 10 in the direction of the bottom of the groove. It is understood that in this movement the total internal volume of cavity 11 remains constant. However, during this movement, the undulations of spring 16 which are close to the constriction zone of cavity 11 flatten more and more thereby reducing partial volumes such as, for example 17a and 18a. Because the height of spring 16 is practically equal to the height of cavity 11, the fluid can escape only in limited amounts at the sides of the spring. Consequently the pressure of the fluid in volumes 17a and 18a at the left will increase while the pressure in the other partial volumes will diminish. After a certain time, the pressure of the fluid in volumes 17a and 18a will become greater than the force of the spring applying summits 16a, 16b of the undulations against the edges of part 8 or 10, which will free a passage, for example, between summits 16b and the bottom of the groove, so that the fluid contained in volume 18a will pass into adjacent volumes 18. The same is true for volumes 17a. The fluid is thus sandwiched between the summits of the spring and the bottoms of the groove or edge of plate 8, thereby creating a damping at the time of radial movement which is added to that created by the passage of fluid between the spring and walls 12 and 13.

Damping is an increasing function of the movement, since the force of the spring increases with the latter.

If a sufficiently viscous fluid is used, for example, one having a viscosity of the order of 100,000 centistokes, it is possible to eliminate spring 16. In this case a radial damping is obtained when part 8 moves toward the left relative to part 10, because a fluid with a viscous consistency, for example a grease, moves to the right part of cavity 11.

Consequently it is possible to obtain an extremely precise adjustment of the desired damping effect since it will be possible to vary different factors such as the viscosity of the fluid, the stiffness of the blade of spring 16, the dimension of partial volumes 17a and 18b, the height of the blade with a more or less play between blade 16 and walls 12 and 13, and finally various possible precompression values of spring 16.

Referring now to FIG. 3, this embodiment is distinguished from that of FIG. 1 mainly by the fact that there are provided two helico-spiral springs 15 and 19 mounted in opposition, peripheral rigid element 2 provided at its upper part with an edge 20 which serves as support for the base of spring 19.

Figure 4:
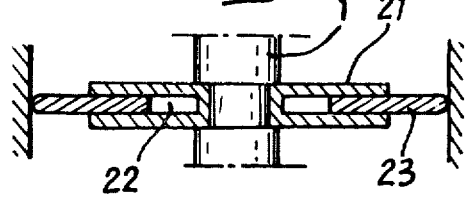
FIG. 4 represents an axial section of a choke element according to a variant of the present invention.

Referring to FIG. 4, it can be seen that the radial choke element comprises (1) a first radial part 21 integral with axial rigid element 1 and having a radial groove 22 open on the outside peripheral side of element 21; and (2) a second part made up of a flat ring 23 capable of moving inside the chamber formed by groove 22. The choke element thus constituted is different from the choke element of FIG. 1 only by the fact that parts 8 and 10 have been interchanged while the functioning thereof remains identical.

Figure 5:
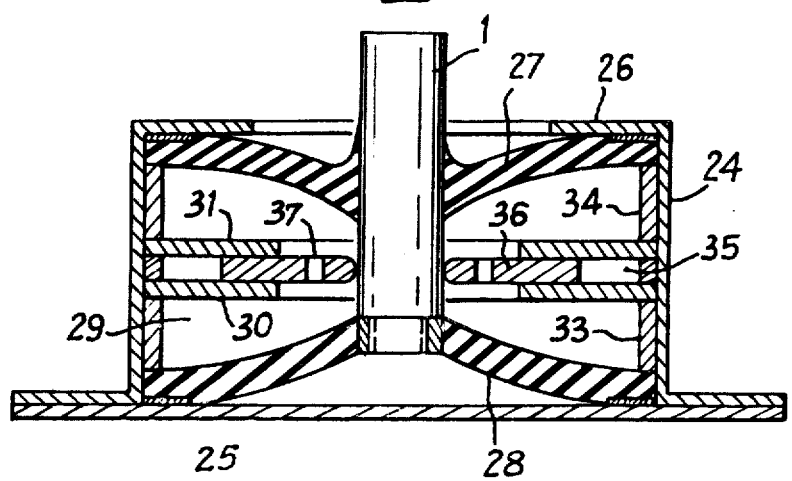
FIG. 5 represents an axial section of an insulator having a radial plane of symmetry.

Referring to FIG. 5, axial rigid element 1 is placed centrally relative to the peripheral rigid element 24 which is provided with a base in the shape of a plate 25 and a flange element 26 directed radially toward the center of the insulator. Two elastomer membranes 27, 28 symmetrical relative to a median radial plane are adhered at their central part to element 1 and at their peripheral part to element 24. Thus, they determine a fluid-tight volume 29 filled with a viscous fluid. This volume 29 is divided into two half volumes by a choke part comprising two radial flat rings extending from peripheral rigid element 24 but having an inside diameter clearly greater than the inside diameter of axial rigid element 1. Rings 30 and 31 are separated by an annular key 32.

To keep the two rings 30, 31 in a stationary position in the middle of peripheral element 24, two other cylindrical spacing keys 33, 34 are provided on both sides of rings 30 and 31.

The two rings 30 and 31, being separated, form between them a groove 35 which also is filled with fluid and receives a disk 36 so as to form said second part of the choke element. Disk 36 is provided with orifices 37 similar to orifices 9. Disk 36 also has a central orifice whose diameter is only slightly greater than the diameter of axial rigid element 1 so as to permit the movement of said axial rigid element 1 through this orifice.

In groove 35 which is also filled with fluid there can be placed a spring similar to spring 16.

It is understood that the functioning of this insulator is similar to that of the insulators of FIGS. 1 to 3. The axial movement of rigid element 1 causes an increase or decrease of the determined half volumes inside volume 29 by the choke element, thus forcing the fluid through orifices 37 so as to obtain a damping effect. On the other hand, radial movement of axial rigid element 1 causes the radial movement of disk 36 in groove 35, thus providing a damping effect by the movement of the fluid contained in said groove 35.

Further, in accordance with yet another embodiment of the present invention the insulator can be provided in the form of a double action jack. Referring to FIG. 1, the peripheral rigid element 2 can constitute the body of the jack, the rod of which is constituted by axial rigid element 1. Membranes 5 and 6 can be eliminated and intake or evacuation conduits can be provided in their place. Further, choke channels 9 can be blocked, thus separating the two half volumes. Under these conditions, there is provided a jack whose piston would be constituted by two parts 8, 10 and whose rod 1 would also be able to move radially, and be damped at the time of its movement.

Although the invention has been described relative to a particular embodiment, it is understood that it is in no way limited, and various modifications of shape and materials can be made without departing from the scope and spirit of the invention.

What is claimed is:
1. A shock and vibration insulator comprising:
 a closed volume including a peripheral rigid element defining, in part, said closed volume and being fastenable to a portion of an installation to be damped,
 an axial rigid element having one end disposed inside of said closed volume and another end disposed outside of said closed volume so as to be fastenable to another portion of the installation,
 said axial rigid element and said peripheral rigid element being movable relative to one another,
 a radial rigid element extending radially between said axial rigid element and said peripheral rigid element and being solidly fixed to one of said rigid elements, said radial rigid element being capable of being subjected to the thrust of a fluid and including:
 a. a first radial part having an internal recess in the shape of an annular groove, and
 b. a second radial part having a peripheral edge with said edge extending into said recess of said first radial part to define an annular chamber and said first and second radial parts being movable relative to one another to vary the volume of said annular chamber, said closed volume and said annular chamber being filled with fluid.

2. A shock and vibration insulator comprising:
a closed volume including a peripheral rigid element defining, in part, said closed volume and being fastenable to a portion of an installation to be damped,
an axial rigid element having one end disposed inside of said closed volume and another end disposed outside of said closed volume so as to be fastenable to another portion of the installation,
said axial rigid element and said peripheral rigid element being movable relative to one another,
a radial rigid element extending radially between said axial rigid element and said peripheral rigid element and being solidly fixed to one of said rigid elements, said radial rigid element being capable of being subjected to the thrust of a fluid and including:
a. a first radial part having an internal recess in the shape of an annular groove, and
b. a second radial part having a peripheral edge with said edge extending into said recess of said first radial part to define an annular chamber and said first and second radial parts being movable relative to one another to vary the volume of said annular chamber,
said closed volume and said annular chamber being filled with fluid,
said shock and vibration insulator further comprising a helico-spiral spring positioned between said axial rigid element and said peripheral rigid element.

3. The insulator of claim 2 including at the interior of said chamber an elastic compartmenting element so as to establish partial volumes and narrow passages between at least some of these volumes for the passage of said fluid when radial movement diminishes some of said partial volumes while increasing others.

4. The insulator of claim 3 wherein said elastic compartmenting element comprises an undulating spring, some summits of which engage the edge of the radial part penetrating into said groove, other summits of which engage the bottom of said groove, the height of said spring being slightly less than the thickness of the groove to form relatively closed partial volumes.

5. The insulator of claim 2 which includes a deformable membrane, connecting said rigid elements to form a deformable fluid-tight volume filled entirely with said fluid, said radial rigid element dividing said volume into said half volumes and further defining at least a passage between said half volumes.

6. The insulator of claim 5 characterized by the fact that the peripheral rigid element comprises a rigid bottom located opposite a single elastic membrane.

7. The insulator of claim 5 characterized by the fact that it comprises two axially separated membranes.

8. The insulator of claim 7 characterized by the fact that one of said membranes has an inwardly oriented arch shape, said membrane being made of an elastic material.

9. The insulator of claim 7 characterized by the fact that it presents a radial plane of symmetry, the said two membranes being solid with the axial rigid element.

10. The insulator of claim 5 characterized by the fact that passages are provided in said second radial part (b) between the two half volumes.

11. The insulator of claim 2 characterized by the fact that the diameter of the radial rigid element is different from the diameter of the rigid element in relation to which it moves so as to achieve a passage between said two half volumes.

12. The insulator of claim 2 characterized by the fact that said axial rigid element constitutes a jack rod, said peripheral rigid element forming a jack body and said axial rigid element forming said jack rod considerably preventing the passage between the two half volumes of said jack body.

* * * * *